United States Patent
Damiani et al.

(10) Patent No.: US 6,636,156 B2
(45) Date of Patent: *Oct. 21, 2003

(54) VEHICLE USER INTERFACE

(75) Inventors: Sergio Damiani, Turin (IT); Enrica Deregibus, Turin (IT); Roberto Montanari, Scandiano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/086,853

(22) Filed: Mar. 4, 2002

(65) Prior Publication Data

US 2002/0080043 A1 Jun. 27, 2002

Related U.S. Application Data

(63) Continuation of application No. 09/559,833, filed on Apr. 28, 2000, now Pat. No. 6,369,717.

(30) Foreign Application Priority Data

Apr. 30, 1999 (IT) ........................................ TO99A0358

(51) Int. Cl.$^7$ ................................................ A08B 5/00
(52) U.S. Cl. .................................... 340/815.4; 340/988
(58) Field of Search ........................... 340/815.4, 323 R, 340/902, 937, 988, 934, 439; 701/201, 208, 211, 24, 36

(56) References Cited

U.S. PATENT DOCUMENTS

| | | | | |
|---|---|---|---|---|
| 5,089,816 A | * | 2/1992 | Holmes, Jr. | 340/995 |
| 5,367,316 A | | 11/1994 | Ikezaki | |
| 5,555,502 A | * | 9/1996 | Opel | 701/36 |
| 5,867,089 A | * | 2/1999 | Zyburt et al. | 340/323 R |
| 5,991,690 A | * | 11/1999 | Murphy | 340/988 |
| 6,088,649 A | * | 7/2000 | Kadaba et al. | 701/201 |
| 6,171,191 B1 | * | 1/2001 | Ogata et al. | 463/378 |
| 6,369,717 B1 | * | 4/2002 | Damiani et al. | 340/815.4 |

FOREIGN PATENT DOCUMENTS

| | | |
|---|---|---|
| DE | 3346370 | 7/1985 |
| DE | 19604351 | 8/1997 |
| EP | 0366132 | 5/1990 |
| EP | 0199916 | 8/1991 |
| EP | 0461360 | 12/1991 |
| EP | 0532987 | 3/1993 |
| EP | 0816155 | 1/1998 |
| EP | 0974926 | 1/2000 |
| GB | 2216994 | 10/1989 |
| WO | 9713657 | 4/1997 |

OTHER PUBLICATIONS

English Translation for EP 199916.
English Translation for EP 366132.
English Translation for EP 974926.
English Translation for EP 461360.

* cited by examiner

*Primary Examiner*—Van Trieu
(74) *Attorney, Agent, or Firm*—Liniak, Berenato & White

(57) ABSTRACT

The user interface has a display unit for displaying user-activatable functions, and a selecting and activating device for selecting and activating the functions and operating according to a selection scheme having four selection directions arranged in the form of a cross. The display unit has four display sectors for displaying respective functions, and which are selected by operating the selecting and activating device in the aforementioned selection directions, and are also arranged in the form of a cross corresponding with that of the selection directions.

20 Claims, 8 Drawing Sheets

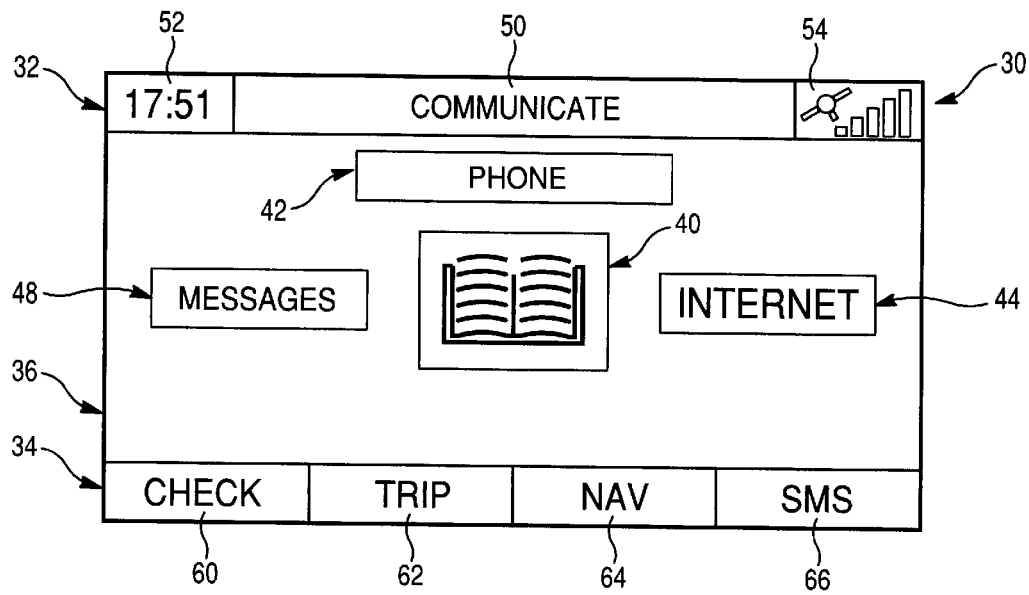
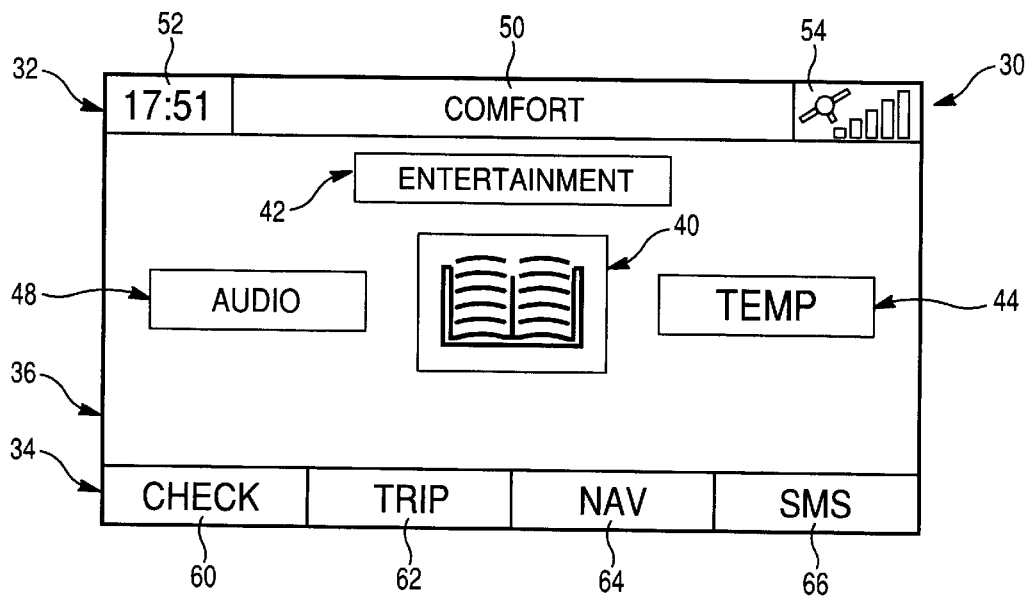

VEHICLE USER INTERFACE

This application is a continuation of U.S. patent application Ser. No. 09/559,833 filed Apr. 28, 2000, now U.S. Pat. No. 6,369,717.

The present invention relates to a vehicle user interface.

BACKGROUND OF THE INVENTION

As is known, in the automotive industry, the current trend in the design of driver- or passenger-performable vehicle functions is increasingly towards solutions characterized by a high degree of interaction between the driver, passengers, vehicle and the outside world.

In particular, drivers and passengers are allowed an increasing amount of control over vehicle efficiency—e.g. air conditioning and stereo systems, etc.—and over interaction between the vehicle and the outside world e.g. control of cellular phone calls, interference by cellular phones when listening to music, control of on-vehicle computer information, dialoguing with the navigation system, etc.

Increasing demand therefore exists for vehicle user interfaces designed to make interaction between the user and the vehicle as simple and immediate as possible, so as not to distract the driver's attention from the road, and which at the same time are reconfigurable to accommodate functions not contemplated at the design stage.

SUMMARY OF THE INVENTION

It is an object of the present invention to provide a reconfigurable user interface designed to make interaction between the user and the vehicle as simple and immediate as possible.

According to the present invention, there is provided a vehicle user interface, characterized by comprising display means for displaying user-activatable functions, and selecting and activating means for selecting and activating said functions; said selecting and activating means operating according to a selection scheme having a number of selection directions arranged radially; and said display means comprising a number of first display sectors for displaying respective said functions, and which are each selectable by activating said selecting and activating means in a respective said selection direction, and are arranged in the same way as the respective said selection directions.

The present invention also relates to a vehicle user interface characterized by comprising display means for displaying user-activatable functions, and activating means for activating said functions; said display means having a display area for displaying said functions, and comprising a number of display sectors arranged side by side along an edge of said display area and each displaying a respective said function; said activating means comprising a number of push-button-type activating elements, one for each said display sector, located adjacent to and corresponding with the respective said display sectors, and each for activating a respective function displayed in the respective display sector; said activating means also comprising a shift control element for varying the functions displayed in said display sectors according to a predetermined shift scheme.

BRIEF DESCRIPTION OF THE DRAWINGS

A preferred, non-limiting embodiment of the present invention will be described by way of example with reference to the accompanying drawings, in which:

FIGS. 4–7 show different function menus displayable on the display unit forming part of the FIG. 1 user interface;

DETAILED DESCRIPTION OF THE INVENTION

Figure 1:
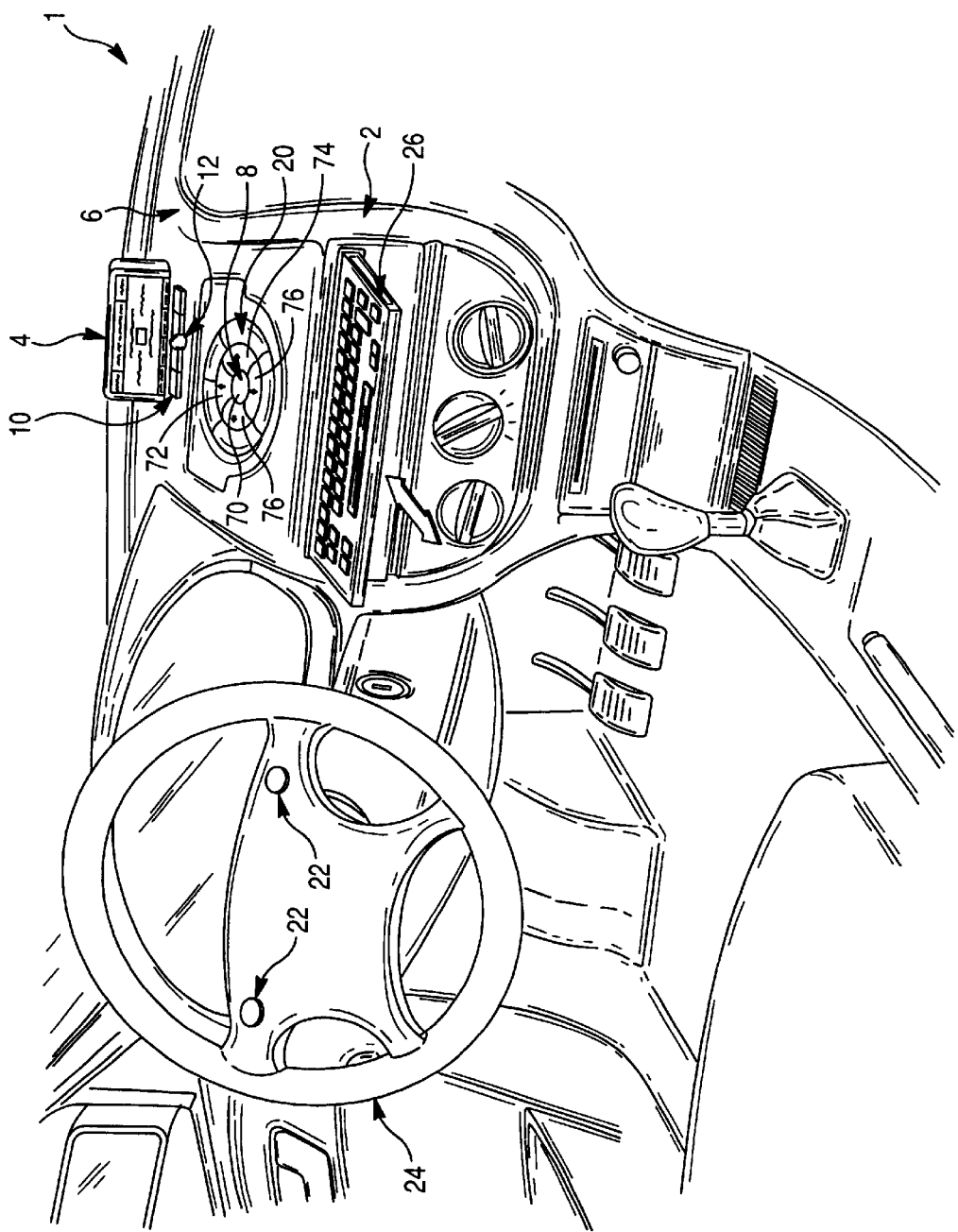
FIG. 1 shows, schematically, the passenger compartment of a vehicle equipped with a user interface in accordance with a first embodiment of the present invention.
Figure 2:
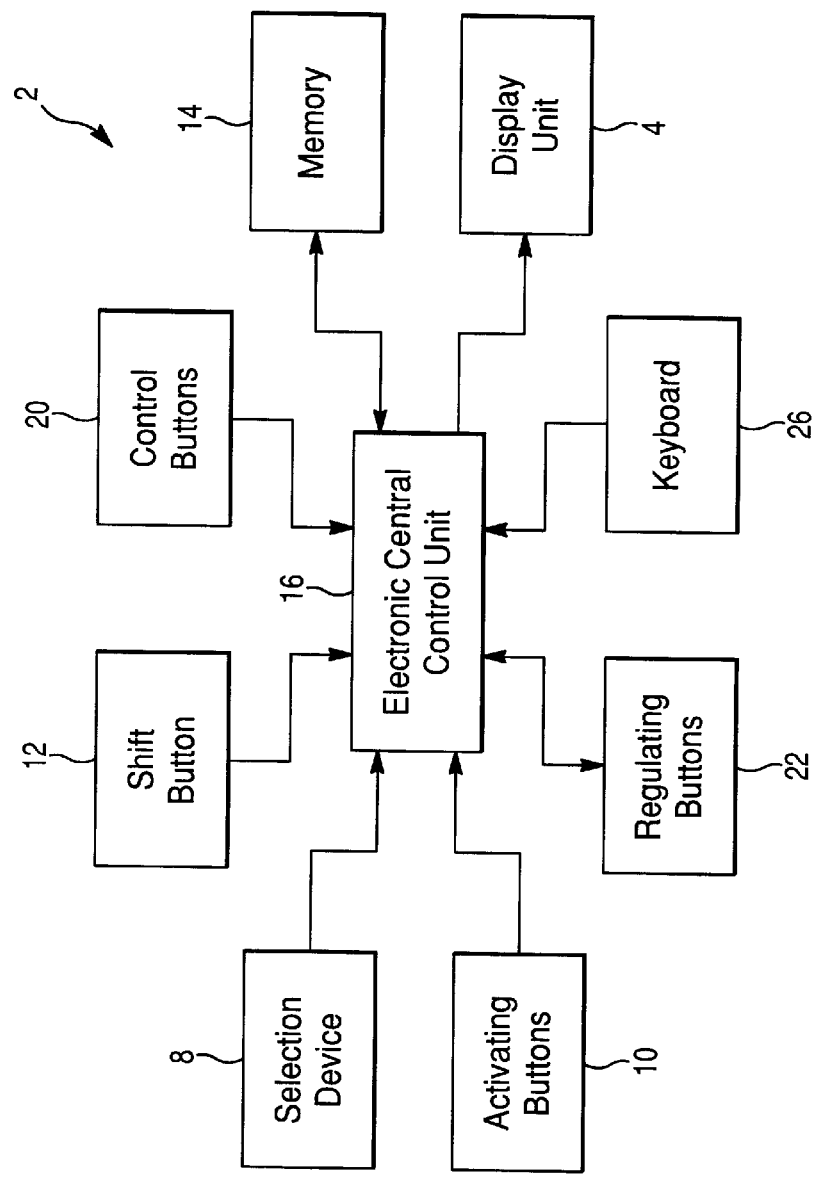
FIG. 2 shows a block diagram of the FIG. 1 user interface.

FIG. 1 shows part of a vehicle passenger compartment 1 equipped with a user interface 2 in accordance with a first embodiment of the present invention, and the overall block diagram of which is shown in FIG. 2.

With reference to FIGS. 1 and 2, user interface 2 substantially comprises a display unit 4, e.g. a liquid crystal display, fitted to the vehicle instrument panel 6 so as to be clearly visible by the driver and passenger, and for displaying various function menus; a selection device 8 for selecting and activating the functions displayed on display unit 4, and which is located close to display unit 4 within easy reach of both the driver and passenger; a number of activating buttons 10 and a shift button 12, located adjacent to display unit 4 and for activating functions displayed on display unit 4 in particular positions, as described in detail later on; a memory 14 (FIG. 2) in which are memorized a number of data items displayable on display unit 4 in the form of function menus; and an electronic central control unit 16 (FIG. 2) connected to display unit 4, to selection device 8, to activating and shift buttons 10, 12, and to memory 14, and for controlling operation of user interface 2 as described in detail below.

User interface 2 also comprises a number of control buttons 20 located on vehicle instrument panel 6, around selection device 8, and connected to electronic central control unit 16 to activate, independently of the displayed function menu, general functions relating to control of display unit 4 and described in detail later on; a number of regulating buttons 22 located on the steering wheel 24 and connected to electronic central control unit 16 to make frequently-used elementary adjustments, such as radio volume and MUTING (deactivation of any devices with sound outputs), etc.; and a keyboard 26 connected to electronic central control unit 16 and for entering data into memory 14.

Display unit 4 has a substantially rectangular display area for displaying various function menus selectable by the driver or passenger using selection device 8.

Figure 3:
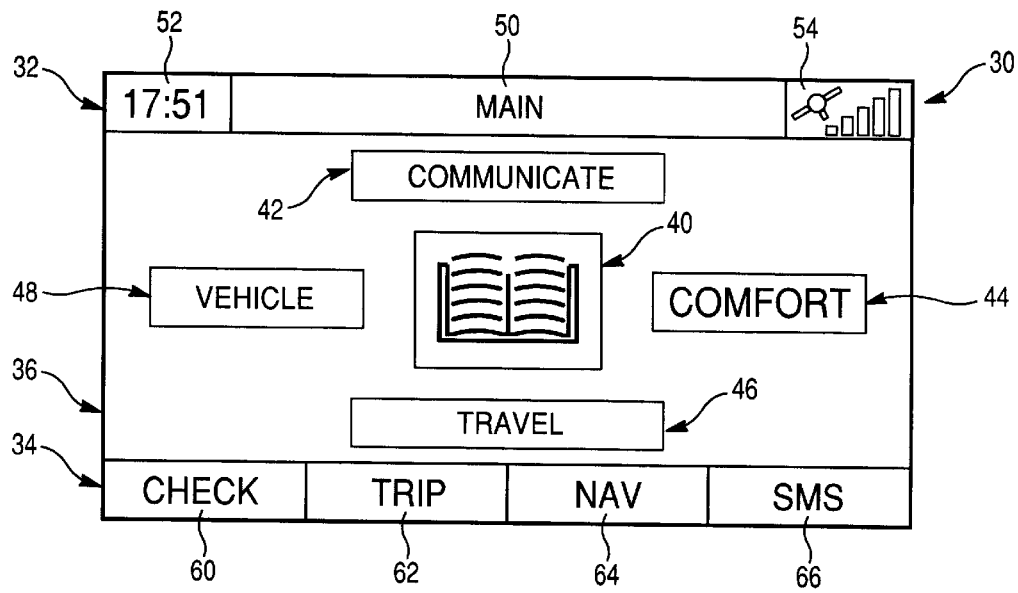
FIG. 3 shows a function menu displayable on a display unit forming part of the FIG. 1 user interface.

FIG. 3 shows the main menu shown in the display area of display unit 4 according to the first embodiment of the present invention.

As shown in FIG. 3, the display area 30 is divided into three display regions: a top region 32 and a bottom region 34, each in the form of an elongated horizontal strip; and a rectangular central region 36 occupying most of display area 30.

Central display region 36 is in turn divided into five sectors, as marked out by the dotted lines in FIG. 3. More specifically, four of the five sectors, indicated 42, 44, 46, 48, are arranged inside central display region 36 in the form of a Greek cross, while the fifth, indicated 40, is located in an intermediate position between sectors 42, 44, 46, 48.

In the FIG. 3 example, display sector 40 shows the icon of an agenda, which, when selected, activates typical electronic organizer functions; and display sectors 42, 44, 46, 48 are headed "COMMUNICATE", "COMFORT", "TRAVEL" and "VEHICLE", which, when selected, respectively activate functions relating to communication with the outside world (telephone, messages, Internet), motoring comfort (entertainment, audio, temperature), interaction between the vehicle and the outside world (navigation, remote toll, traffic and travel information), and vehicle efficiency control (maintenance, diagnosis, security, travel parameter settings).

Top display region 32 is divided into three horizontally side by side, substantially rectangular sectors: a central sector 50 conveniently indicating the menu selected; a lateral sector 52 showing, for example, the time; and a lateral sector 54 displaying, for example, two GSM and GPS signal indications (i.e. telephone signal intensity and coverage of absolute position detecting satellites).

Bottom display region 34 is divided into four horizontally side by side, substantially rectangular display sectors 60, 62, 64, 66 headed, for example, "CHECK", "TRIP", "NAV", "SMS", which, when selected, activate so-called "soft-key" functions for respectively checking vehicle efficiency, operating the so-called on-vehicle computer, operating the navigation system, and transmitting or receiving telephone messages.

The "soft-key" functions in display sectors 60, 62, 64, 66 are activated by respective activating buttons 10, which, for immediate association with the respective functions, are located side by side, on instrument panel 6, along the bottom edge of display unit 4, each corresponding with the display sector 60, 62, 64, 66 indicating the respective function.

The functions shown in display sectors 60, 62, 64, 66 and activated by buttons 10 are greater in number than display sectors 60, 62, 64, 66 and activating buttons 10, and can be displayed and used by the driver using shift button 12, which, when operated, displays and cyclically "shifts" the various functions in display sectors 60, 62, 64, 66.

Purely by way of a non-limiting example, FIGS. 4, 5, 6 and 7 show the menus shown in display area 30 when the "COMMUNICATE", "COMFORT", "TRAVEL" and "VEHICLE" items in the FIG. 3 main menu are selected respectively.

As can be seen, the menu items in central display area 36 in FIGS. 4–7 are also arranged in the form of a Greek cross as in the main menu, and the central display sector 50 of top display region 32 shows the selected main menu item to which the displayed menu refers.

Each of the displayed function menus need not necessarily have four, and may have less than four, selection items, as shown, for example, in FIGS. 4 and 5, in which one of the display sectors—46 in the example shown—is blank.

Figure 8:
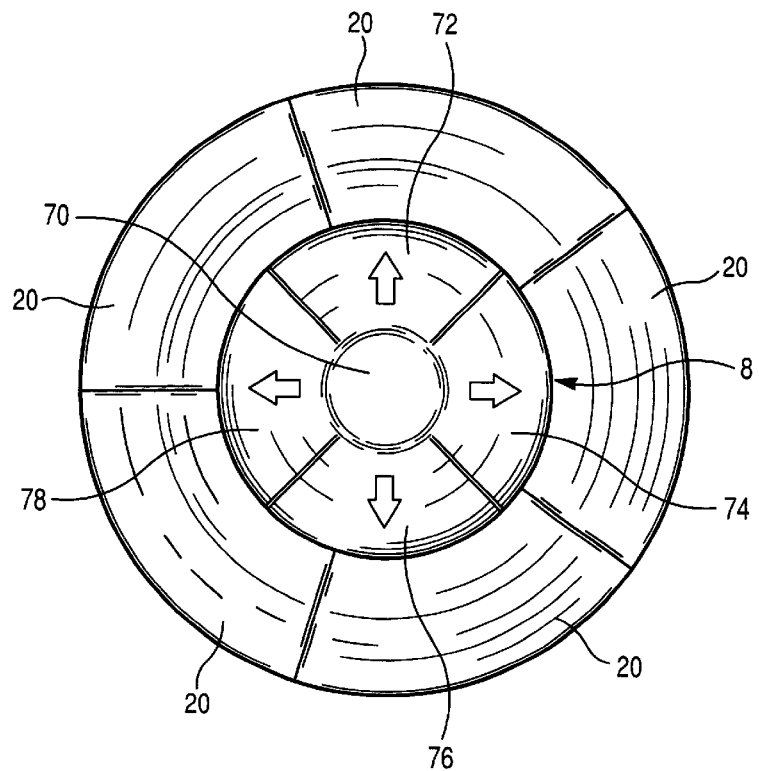
FIG. 8 shows the arrangement of selection buttons forming part of the FIG. 1 user interface.
Figure 6:
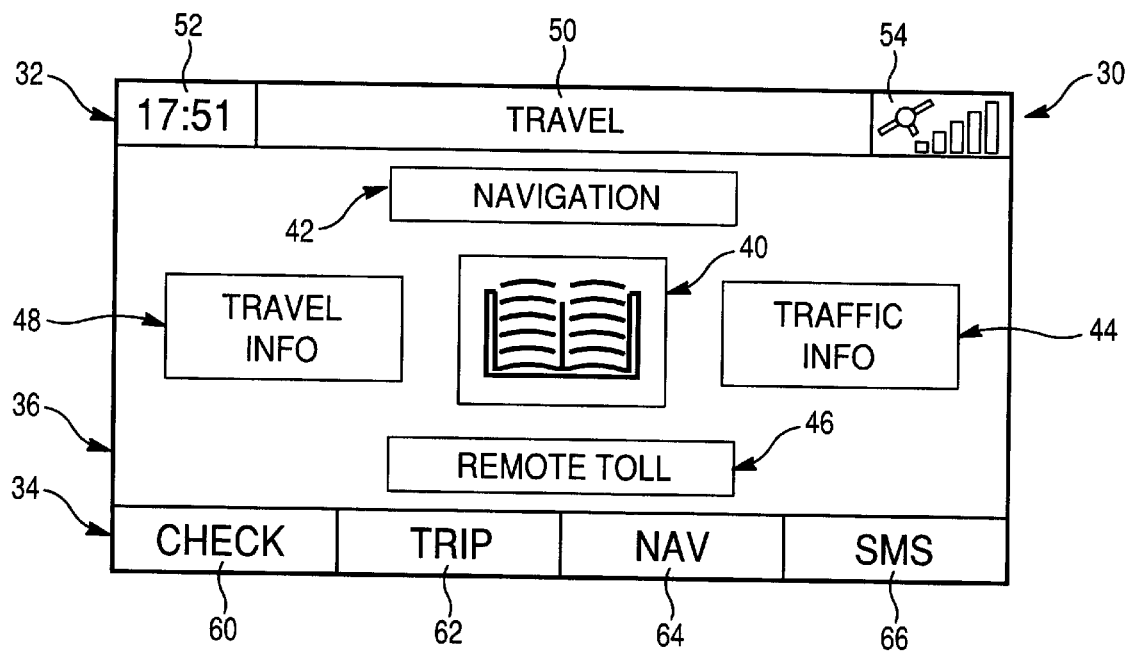
Figure 7:
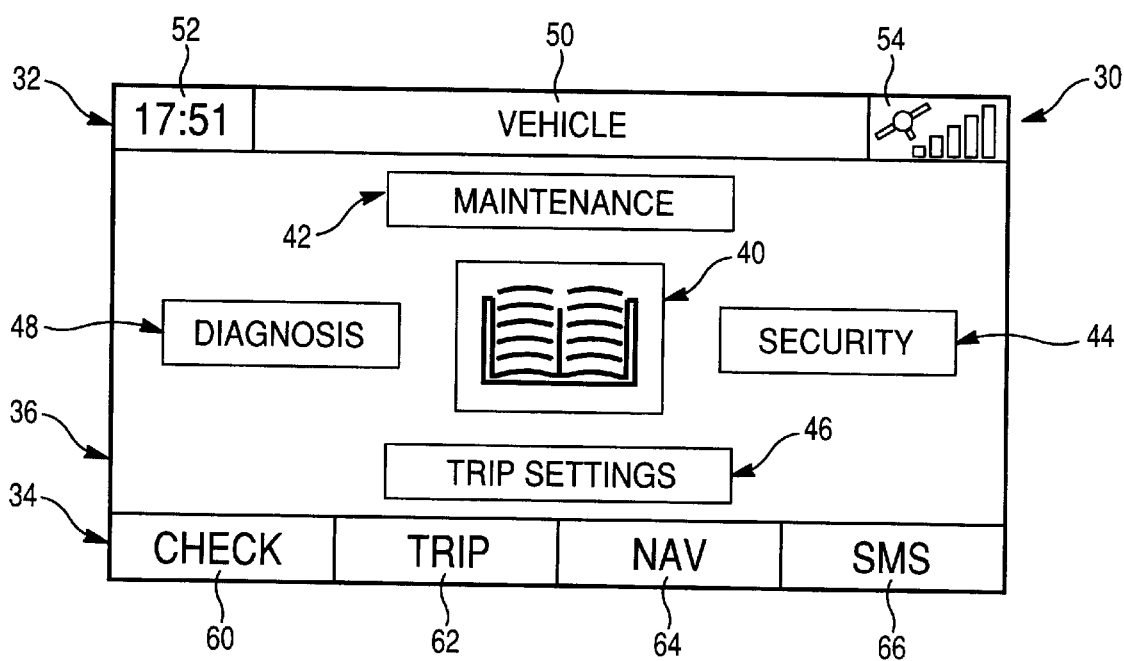

The functions in display sectors 42, 44, 46, 48 are selected and activated using selection device 8, shown in detail in FIG. 8, which comprises five selection buttons 70, 72, 74, 76, 78 arranged the same way as display sectors 42, 44, 46, 48. More specifically, four of the five selection buttons—indicated 72, 74, 76, 78—are arranged in the form of a Greek cross and provide for selecting the function menu items; and an activating button 70 is located in an intermediate position between selection buttons 72, 74, 76, 78, and provides for activating the selected function.

The matching arrangement of selection buttons 72, 74, 76, 78 and display sectors 42, 44, 46, 48 indicating the various function menu items means each function menu item can be selected using one selection button, thus enabling fast, easy function selection and activation by both the passenger and driver, while at the same time barely distracting the driver's attention from the road.

The functions in each menu can be memorized extremely easily by the driver, and continued use of user interface 2 eventually makes for spontaneous function selection and activation without distracting the driver's attention from the road at all.

The five control buttons 20 around selection device 8 provide for performing generic display unit 4 operating functions independently of the menu selected.

More specifically, control buttons 20 provide for returning to the main menu at any time and from any other menu; deactivating the currently activated function and returning to the previous function; calling up a help menu relative to the function currently being selected by the user; turning off display unit 4 without deactivating user interface 2; and activating the phone call function, which, being typically the most frequently used, can be performed at any time and in any menu.

Figure 9:
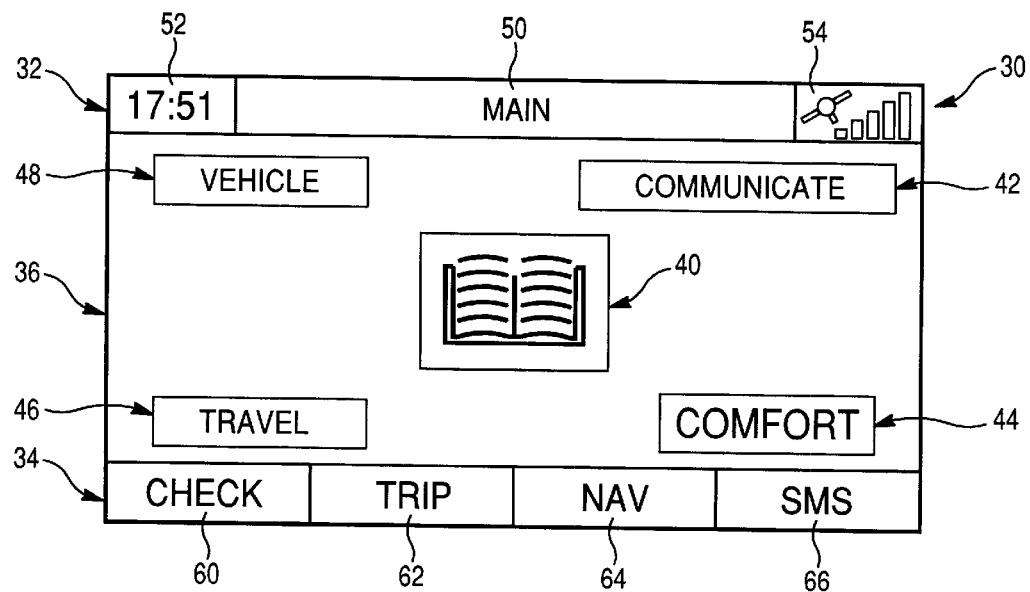
FIG. 9 shows a function menu displayable on the display unit of a user interface in accordance with a second embodiment of the present invention.

FIG. 9 shows the main menu shown on display unit 4 of a user interface in accordance with a second embodiment of the present invention.

As shown in FIG. 9, the main menu in the second embodiment of the present invention only differs from that of the first embodiment in FIG. 3 by display sectors 42, 44, 46, 48 being arranged about central display sector 40 in the form of a St Andrew's as opposed to a Greek cross.

Figure 10:
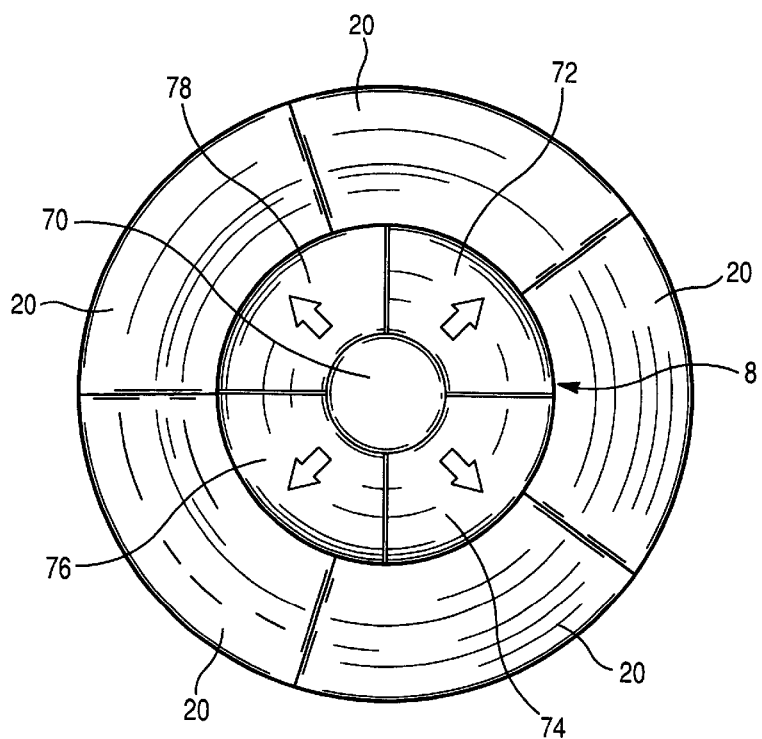
FIG. 10 shows the arrangement of selection buttons forming part of the user interface according to the second embodiment of the present invention.

Consequently, for the arrangement of selection buttons 72, 74, 76, 78 of the selection device to match that of display sectors 42, 44, 46, 48, the selection device in the second embodiment of the present invention—here indicated 8'—is as shown in FIG. 10, in which the four selection buttons 72, 74, 76, 78 are arranged in the form of a St Andrew's cross.

Figure 11:
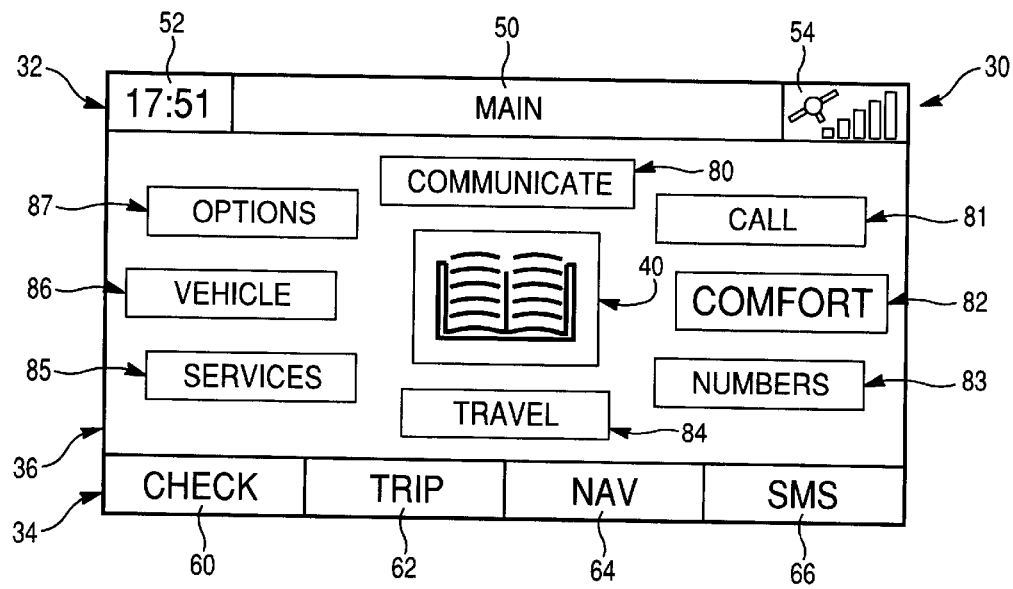
FIG. 11 shows a function menu displayable on the display unit of a user interface in accordance with a third embodiment of the present invention.

FIG. 11 shows the main menu shown on display unit 4 of a user interface in accordance with a third embodiment of the present invention.

As shown in FIG. 11, the main menu in the third embodiment of the present invention only differs from that of the first embodiment in FIG. 3 by the display sectors about central display sector 40 being eight in number and arranged radially.

More specifically, in addition to the "COMMNICATE", "COMFORT", "TRAVEL" and "VEHICLE" items already described relative to the FIG. 3 function menu, the eight display sectors—indicated 80–87 in FIG. 11—about display sector 40 also show a further four items—in the example shown, "CALL", "NUMBERS", "SERVICES" and "OPTIONS"—which, when selected, activate respective functions not described in detail by not forming part of the present invention.

Figure 12:
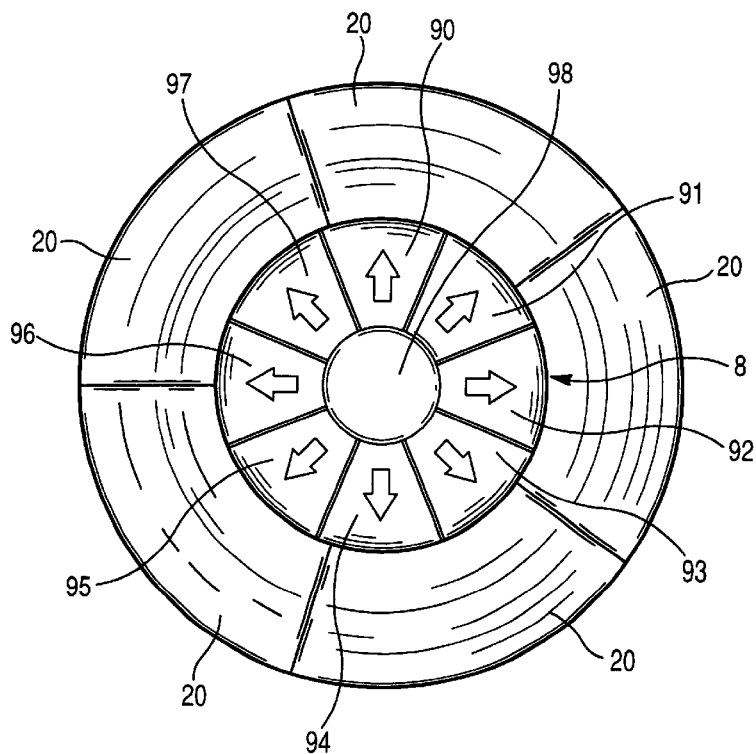
FIG. 12 shows the arrangement of selection buttons forming part of the user interface according to the third embodiment of the present invention.

Consequently, for the arrangement of the selection device selection buttons to match that of display sectors 80–87, the selection device 8" in the third embodiment of the present invention comprises, as shown in detail in FIG. 12, eight selection buttons 90–97 arranged radially and for selecting function menu items, and an activating button 98 located in an intermediate position between selection buttons 90–97 and for activating the selected function.

As can be seen clearly from a comparison of FIGS. 3, 9 and 11, the Greek and St Andrew's cross arrangements are also radial, though comprising only four as opposed to eight display sectors. Generally speaking, therefore, to more effectively communicate information to the user, numerous radial arrangements are possible, ranging from a "minimum" arrangement of two radial directions for selecting only two display sectors about the central display sector, to more complex arrangements with multiple radial directions for selecting respective display sectors arranged radially about the central display sector.

The advantages of user interface 2 according to the present invention will be clear from the foregoing description.

In particular, the marching arrangement of the selection buttons and of the display sectors about the central display sector makes for fast, easy function menu item selection using only one selection button.

Accordingly, selection distracts the driver's attention to only a very limited degree from the road, and even less as time goes by and the driver becomes more familiar with the interface.

Moreover, the user interface according to the present invention is highly reconfigurable by enabling both an increase in the number of functions performable, and the inclusion of new functions not contemplated at the design stage.

Clearly, changes may be made to the user interface as described and illustrated herein without, however, departing from the scope of the present invention.

For example, the selection devices may differ from those described and, in particular, be defined by any type of device operating according to a selection scheme with four directions in the form of a Greek cross, according to a selection scheme with four directions in the form of a St Andrew's cross, or according to a selection scheme with eight radial directions.

Figure 13:
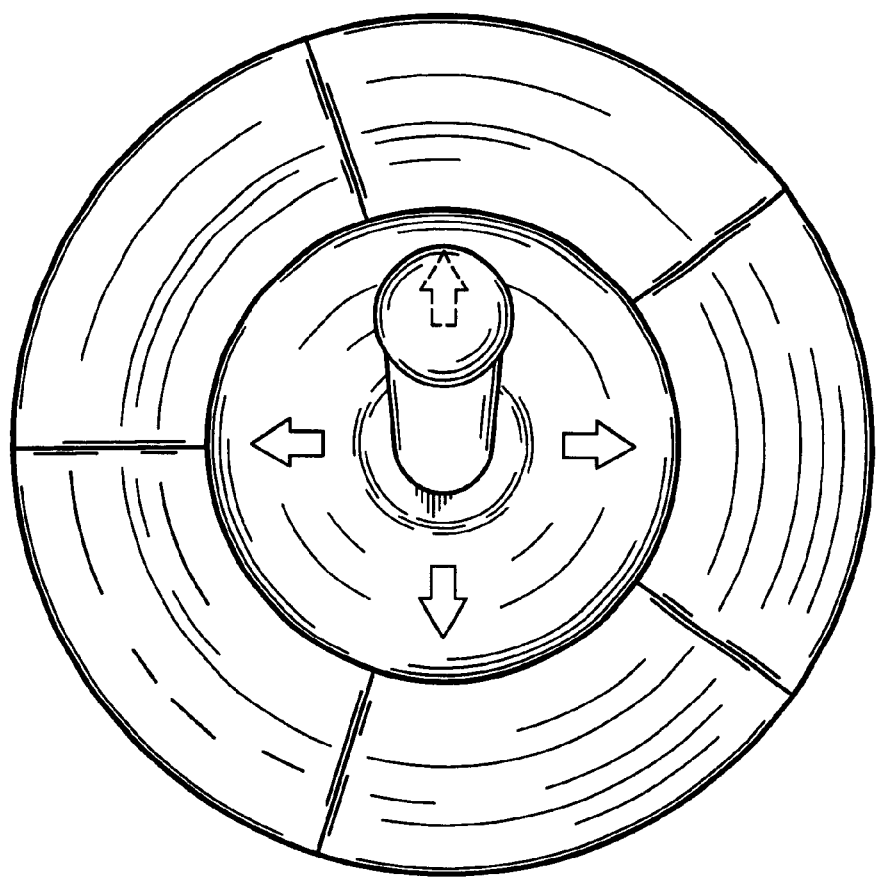
FIG. 13 shows the arrangement of a toggle-type selection button forming part of the FIG. 1 user interface.

In particular, each selection device may be defined, for example, by a "joystick" with a separate activating button; or by a four- or eight-direction toggle element (four directions for cross selection schemes, and eight for radial selection schemes), i.e. having four or eight selection portions arranged in the form of a cross or radially, and itself defining the activating button or having a separate activating button (see, for example, FIG. 13).

Display unit 4 may be a different type from the one described; display unit 4 and the display area 30 defined by it may differ from those described; top and bottom display regions 32, 34 may be replaced with corresponding vertical right and left display regions, in which case, activating buttons 10 would be arranged in a vertical column along the "soft-key" side of display unit 4; the display sectors into which top and bottom display regions 32, 34 are divided may differ in number from those described; top and bottom display regions 32, 34 may differ in shape from those described and, in particular, may be in the form of an undulated strip, so that display sectors 60, 62, 64, 66 are at different heights as opposed to being aligned with one another; activating buttons 10 may be located on the display unit itself as opposed to the instrument panel; or the display unit may be a "touch-screen" type, in which case, the user interface will have no activating buttons 10. It should also be stressed that the menu items and/or graphic symbols shown in the various display sectors into which the display area is divided, and described with reference to FIGS. 3–7, 9 and 11, are purely non-limiting examples of the possible content of the display sectors, and vary according to the functions to be performed.

What is claimed is:

1. A vehicle user interface, comprising:
   display sectors to display user-activatable functions, said display sectors comprising a number of first display sectors for displaying respective said user-activatable functions, and
   selecting and activating elements for selecting and activating said user-activatable functions, said selecting and activating elements operating according to a selection scheme having a number of selection directions arranged radially,
   wherein said display sectors are each selectable by activating said selecting and activating elements in respective said selection directions, and said display sectors are arranged in the same way as the respective said selection directions, and
   wherein a first relative spatial position of said selecting and activating elements corresponds to a second relative spatial position of corresponding display sectors respectively activated by said selecting and activating elements.

2. A vehicle user interface as claimed in claim 1, wherein said selecting and activating elements operate according to a selection scheme having four selection directions arranged in the form of a cross.

3. A vehicle user interface as claimed in claim 2, wherein said display sectors comprise four of said first display sectors arranged in the form of a cross.

4. A vehicle user interface as claimed in claim 2, wherein said selecting and activating elements operate according to a selection scheme having four selection directions arranged in the form of a t-shaped cross.

5. A vehicle user interface as claimed in claim 4, wherein said first display sectors are arranged in the form of a t-shaped cross.

6. A vehicle user interface as claimed in claim 2, wherein said selecting and activating elements operate according to a scheme having four selection directions arranged in the form of an x-shaped cross.

7. A vehicle user interface as claimed in claim 6, wherein said first display sectors are arranged in the form of an x-shaped cross.

8. A vehicle user interface as claimed in claim 2, wherein said selecting and activating elements comprise four push-button-type selecting elements arranged in the form of a cross.

9. A vehicle user interface as claimed in claim 8, wherein said selecting and activating elements further comprise a push-button-type activating element for activating the selected function and located in an intermediate position between said push-button-type selecting elements.

10. A vehicle user interface as claimed in claim 2, wherein said selecting and activating elements comprise a toggle-type selecting element having four selection portions arranged in the form of a cross.

11. A vehicle user interface as claimed in claim 1, wherein said selecting and activating elements operate according to a selection scheme having eight selection directions arranged radially.

12. A vehicle user interface as claimed in claim 11, wherein said display sectors comprise eight sectors of said first display sectors arranged radially.

13. A vehicle user interface as claimed in claim 11, wherein said selecting and activating elements comprise eight push-button-type selecting elements arranged radially.

14. A vehicle user interface as claimed in claim 13, wherein said selecting and activating elements further comprise a push-button-type activating element for activating the selected function and located in an intermediate position between said selecting elements.

15. A vehicle user interface as claimed in claim 11, wherein said selecting and activating elements comprise a toggle-type selecting element having eight selection portions arranged radially.

16. A vehicle user interface as claimed in claim 1, wherein said display sectors also comprise a second display sector for displaying said functions and located in an intermediate position between said first display sectors.

17. A vehicle user interface for a vehicle, comprising display means for displaying user-activatable functions to provide interaction between a user and a vehicle, said display means comprising a display area for displaying said functions and a number of display sectors arranged side-by-side adjacent to said display area, said display sectors each displaying a respective one of said functions; and activating means for activating said functions, said activating means comprising a number of push-button-type activating elements, one for each said display sector, located adjacent to and corresponding to respective said display sectors, wherein each of said push-button-type activating elements activate a respective function displayed in a respective display sector;

said activating means further comprising a shift control element for varying the functions displayed in said display sectors according to a predetermined shift scheme.

18. A vehicle user interface as claimed in claim 17, wherein said predetermined shift scheme is a cyclic shift scheme.

19. A vehicle user interface as claimed in claim 17, wherein said display sectors are arranged side by side along a bottom edge of said display area.

20. A vehicle user interface as claimed in claim 17, wherein said activating elements and said shift control element are located on an instrument panel of said vehicle.

* * * * *